(12) United States Patent
Hansen (10) Patent No.: US 6,876,122 B2
(45) Date of Patent: Apr. 5, 2005

(54) CIRCULAR RAIL LINEAR INDUCTION MOTOR

(75) Inventor: Brad C. Hansen, Franklin, IN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/244,804

(22) Filed: Sep. 16, 2002

(65) Prior Publication Data

US 2004/0051401 A1 Mar. 18, 2004

(51) Int. Cl.[7] .............................................. H20K 3/00
(52) U.S. Cl. ..................... 310/268; 310/266; 310/166; 310/167; 310/177; 310/12; 310/90.5; 104/287; 104/290
(58) Field of Search .................. 310/288, 266, 310/166, 167, 177, 12, 90.5; 104/287, 290

(56) References Cited

U.S. PATENT DOCUMENTS

| | | | |
|---|---|---|---|
| 3,629,262 A | 12/1971 | Abbott | |
| 4,095,150 A | * 6/1978 | Senckel | 318/227 |
| 4,196,946 A | * 4/1980 | Lipscomb | 308/10 |
| 4,477,745 A | * 10/1984 | Lux | 310/156 |
| 4,501,980 A | 2/1985 | Welburn | |
| 4,714,853 A | 12/1987 | Hansen | |
| 4,817,494 A | 4/1989 | Cowan | |
| 5,481,146 A | * 1/1996 | Davey | 310/90.5 |
| 5,552,649 A | 9/1996 | Marder | |
| 5,818,144 A | 10/1998 | Kim | |
| 5,854,521 A | 12/1998 | Nolle | |
| 5,950,543 A | 9/1999 | Oster | |
| 5,994,798 A | 11/1999 | Chitayat | |
| 6,125,453 A | 9/2000 | Wyss | |
| 6,163,091 A | 12/2000 | Hazelton et al. | |
| 6,373,159 B1 | * 4/2002 | Shinozaki | 310/90.5 |
| 6,486,582 B1 | * 11/2002 | Patarchi | 310/166 |
| 6,590,953 B2 | * 7/2003 | Suzuki | 310/15 |

OTHER PUBLICATIONS

Sciencword.eolfrom.com*
Brainy Dictionary www.braimydictionary.com*
The Pulsed Linear Induction Motor Concept for High–Speed Trains, Sandia Report Sand95–1268 UC–1500.
The Physics of Seraphim, paper by Barry Marder, Target and Z–pinch Theory, Sandia National Laboratories.

* cited by examiner

*Primary Examiner*—Nicholas Ponomarenko
*Assistant Examiner*—Iraj A. Mohandesi
(74) *Attorney, Agent, or Firm*—Wall Marjama & Bilinski LLP (57) ABSTRACT

The present invention is directed to an electric motor for rotating an object around a central axis. The electric motor includes a motor casing. A circular segmented rail element is disposed within the motor casing about the central axis. The circular segmented rail element includes metallic non-ferrous segments interleaved with non-metallic segments. Each of the metallic non-ferrous segments has a predetermined segment length. At least one coil element is connected to the motor casing. The circular segmented rail element is disposed adjacent the at least one coil element. The at least one coil element has a predetermined coil length that is less than or equal to the predetermined segment length. The at least one coil element is configured to apply electromagnetic energy to the circular segmented rail element, such that the circular segmented rail element rotates around the central axis.

32 Claims, 5 Drawing Sheets

CIRCULAR RAIL LINEAR INDUCTION MOTOR

BACKGROUND OF THE INVENTION

1. Field of the Invention

The present invention relates generally to electric motors, and particularly to linear induction motors.

2. Technical Background

Electric motors have long been used in a host of industrial applications. Typically, an electric motor includes a rotor and a stator. The rotor essentially is a movable stage that includes a series of permanent magnets that are free to move with the stage. The stator includes a series of armature windings, or coils, mounted to a stationary base plate. This arrangement can be reversed such that the permanent magnets are stationary, with the coils mounted on the stator. In either case, the stage is propelled in the desired direction by energizing the coils. Depending on the application and/or design, either DC or AC electricity may be applied. The coils produce a magnetic flux when electrically energized. The interaction of the permanent magnets with the magnetic flux generated by the coils produces electromagnetic forces commonly referred to as Lorentz forces. The mass of the rotor spins inside a circular stator in response to these electromagnetic forces. Thus, electric motors convert electrical energy into rotating kinetic energy. By the nature of their design, these motors transfer the rotating kinetic energy externally through a rotating shaft connected to the center of the rotor.

The aforementioned approach has several drawbacks. Because magnets are employed in the rotor, the motor is typically very heavy. This also results in high-inertia low-torque motors. What is needed is a new type of stationary electric motor that offers the advantages of mechanical simplicity, light weight, high speed and power, with increased efficiency at high speed. What is also desirable is a motor that applies rotational kinetic energy to a rail surrounding a central void, or encircling the device itself, instead of merely spinning a shaft connected to the center of a rotor.

SUMMARY OF THE INVENTION

The present invention addresses the needs described above. The stationary electric motor of the present invention is both mechanically simple and light weight. The present invention provides a motor characterized by high speed and power. This motor is also very efficient at high speed. One feature of the motor is that it can be configured to apply rotational kinetic energy to both a rail surrounding a central void or a rail encircling the device itself, in addition to rotating a central drive shaft.

One aspect of the present invention includes an electric motor for rotating an object around a central axis. The electric motor includes a motor casing. A circular segmented rail element is disposed within the motor casing, a predetermined radial distance from the central axis. The circular segmented rail element includes metallic non-ferrous segments interleaved with non-metallic segments. Each of the metallic non-ferrous segments has a predetermined segment length. At least one coil element is connected to the motor casing. The circular segmented rail element is disposed adjacent the at least one coil element. The at least one coil element has a predetermined coil length that is less than or equal to the predetermined segment length. The at least one coil element is configured to apply electromagnetic energy to the circular segmented rail element, such that the circular segmented rail element rotates around the central axis.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the electric motor of the present invention is shown in FIG. 1, and is designated generally throughout by reference numeral 10.

In accordance with the invention, the present invention is directed to an electric motor for rotating an object around a central axis. The electric motor includes a motor casing. A circular segmented rail element is disposed within the motor casing, a predetermined radial distance from the central axis. The circular segmented rail element includes metallic non-ferrous segments interleaved with non-metallic segments. Each of the metallic non-ferrous segments has a predetermined segment length. At least one coil element is connected to the motor casing. The circular segmented rail element is disposed adjacent the at least one coil element. The at least one coil element has a predetermined coil length that is less than or equal to the predetermined segment length. The at least one coil element is configured to apply electromagnetic energy to the circular segmented rail element, such that the circular segmented rail element rotates around the central axis. The motor described herein is powerful, mechanically simple and light weight. This electric motor is also relatively efficient at high speed.

Figure 1:
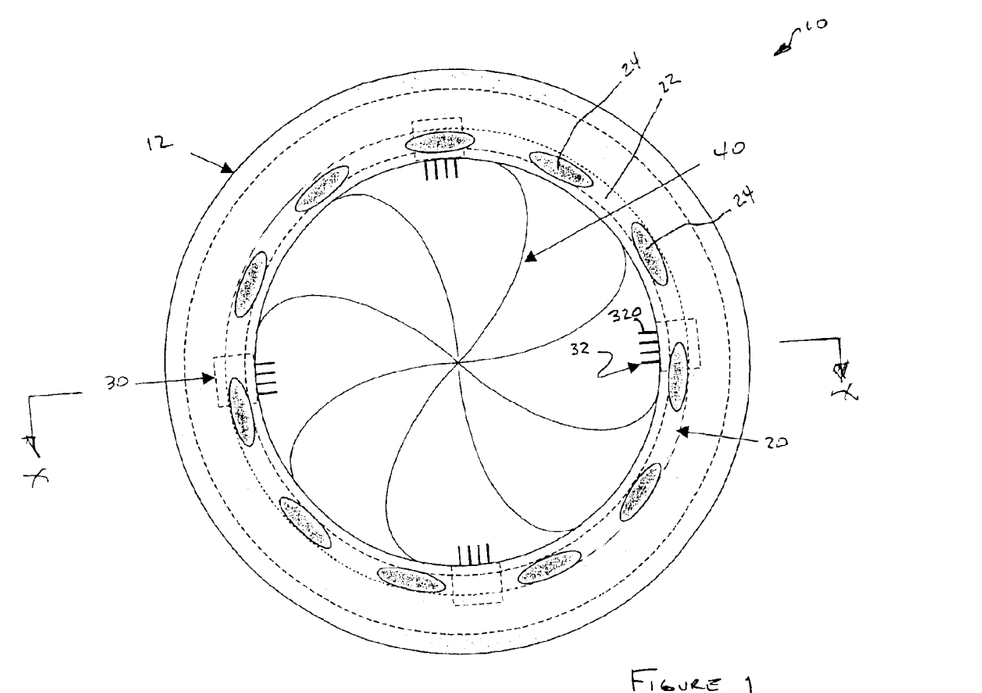
FIG. 1 is a plan view of the circular rail induction motor in accordance with a first embodiment of the present invention.

As embodied herein, and depicted in FIG. 1, a plan view of the circular rail linear induction motor 10 in accordance with a first embodiment of the present invention is disclosed. Linear induction motor 10 includes circular segmented rail 20 disposed within motor casing platform 12. Rail 20 includes metallic non-ferrous segments 22 interleaved with non-metallic segments 24. Rail 20 does not include any permanent magnets. In the embodiment depicted herein, four coil-pairs 30 are disposed in motor casing 12 at 90° intervals. Each coil in a coil-pair 30 includes a passive heat sink device 32. Those of ordinary skill in the art will recognize that anytime current flows through a conductor, such as the wires comprising coil pairs 30, heat energy is generated in accordance with the well-known current-resistance relationship $Q=(I^2R)t$. The thermal energy generated within a coil-pair 30 is transferred to heat sink device 32 and dissipated by fins 320.

Those of ordinary skill in the art will recognize that only one coil-pair 30 is required to practice the present invention. However, multiple coil-pairs are used to increase the power supplied to the segmented rail 20. In one embodiment, two pairs of coils are disposed in casing 12, 180° one from the other. In the embodiments shown in FIGS. 1–4, four coil-pairs are used to equalize the torque symmetrically around rail 20. Any number of pairs of coils may be used depending on an appropriate balancing of cost and power.

Figure 2:
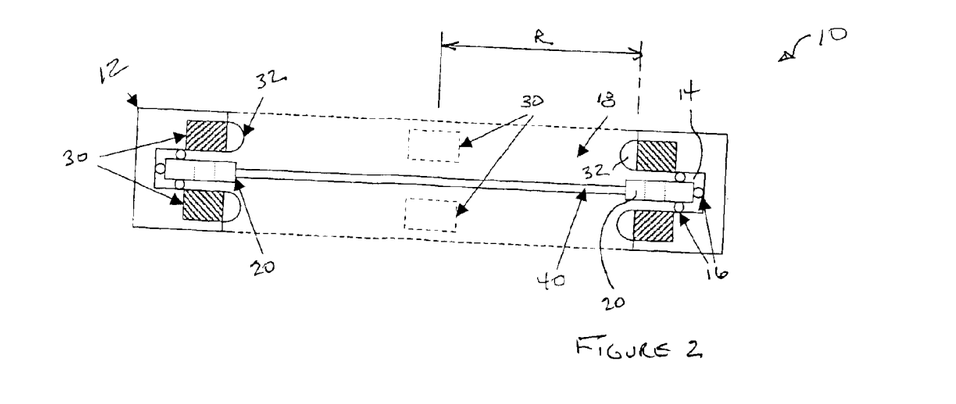
FIG. 2 is a cross-sectional view of the motor taken through line X—X in FIG. 1.

Referring to FIG. 2, a cross-sectional view of the linear induction motor taken through line X—X in FIG. 1 is disclosed. As shown, circular rail 20 is retained within motor casing 12 by means of groove 14. Rail 20 is disposed between the coils in each coil-pair 30. Bearings 16 are disposed between rail 20 and casing 12, allowing rail 20 to freely rotate within groove 14. It is important to note that motor 10 does not include any components (such as a drive shaft), or interior mass, within the void 18 defined by radial distance R. As a result, motor 10 is an exceptionally light weight device. The empty volume may be used to house the load, or some other object. For example, in FIG. 1, fan 40 is attached to rail 20 and disposed in void 18.

Circular segmented rail 20 may be of any suitable type, and it will be apparent to those of ordinary skill in the pertinent art that modifications and variations can be made to rail 20 of the present invention depending on weight constraints and other fabrication issues. For example, rail 20 may be fabricated by the deposition of metallic strips, the placement of metallic plates, or by the placement of shorted coils on a circular structure formed from a non-metallic material such as light-weight plastic. A wood or composite material may also be used for the circular structure. The metallic plates or shorted coils positioned on the structure comprise the metallic segments of rail 20, whereas the exposed gaps between the metallic plates form the non-metallic segments. In another embodiment, rail 20 is metallic web structure including a top metal rail connected to a bottom metal rail by metal strips disposed therebetween at regular intervals. In this embodiment, the non-metallic segments are the voids disposed between the metal strips that connect the top rail to the bottom rail. Any suitable metal may be used to fabricate rail 20 depending a size and weight constraints. For example, rail 20 may be fabricated using aluminum or a light weight alloy. In yet another embodiment, the rail is formed from a continuous strip of non-ferrous metal. The interleaved non-metallic segments are formed by cutting slots into the continuous metal strip. Again, any suitable metal may be employed.

It will be apparent to those of ordinary skill in the pertinent art that modifications and variations can be made to coil-pair 30 of the present invention depending on the size and scale of the motor application. For example, coil-pairs are not required, only one coil is sufficient. However, with a two coil embodiment, vertical components of the reactive forces are equal and opposite, which at higher speeds, contribute to a near-frictionless mode of operation, when symmetrically placed coil-pairs fire instantaneously. In the coil-pair embodiment, the coils used in each coil-pair 30 are usually identical. Each coil may include several hundred turns of copper wire in a plane parallel to segmented rail 20. As shown in FIGS. 1–4, the coils may have a rectangular shape, however, those of ordinary skill in the art will recognize that other geometries may be used. For instance, coil-pairs 30 may be implemented with a circular shape.

Motor Casing 12 may be of any suitable material depending on weight and durability. For example, casing 12 may be fabricated from a light weight plastic material, wood, a composite material, or from metal. In the embodiment depicted in FIG. 1, the outer portion of the motor casing does not need to have a circular shape. The outer portion may be of any suitable shape depending on the application. For example, the shape may be irregular, oblong, or rectangular. In the embodiment depicted in FIG. 3 and FIG. 4, the outer portion of the motor casing must be circular.

Figure 3:
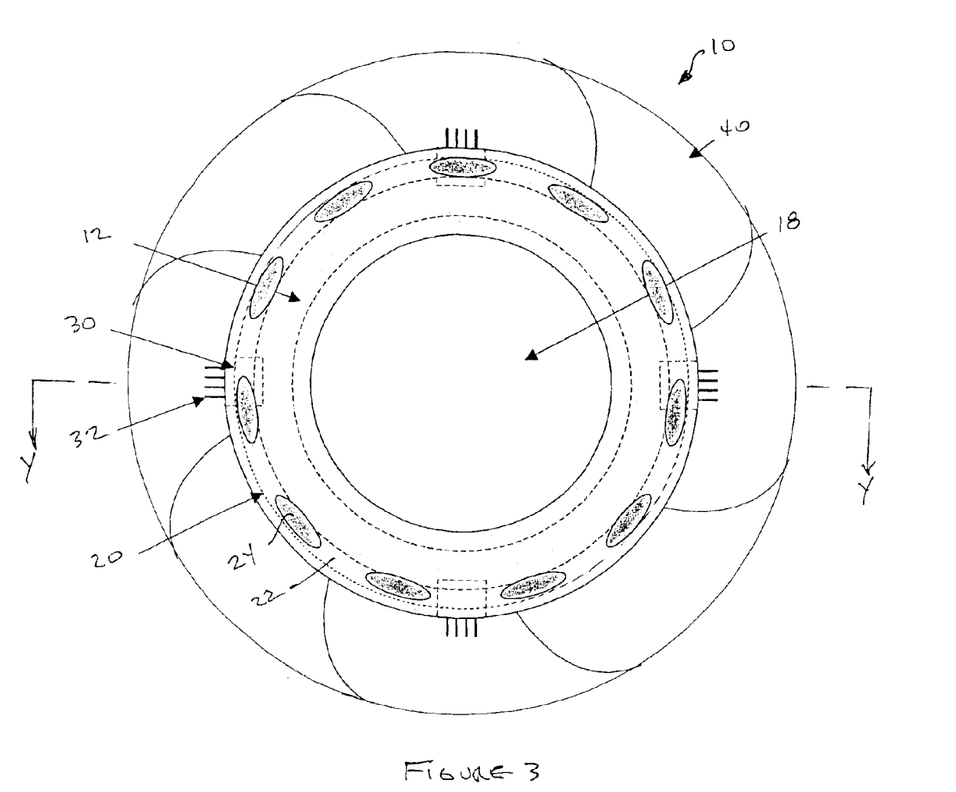
FIG. 3 is a plan view of the circular rail induction motor in accordance with a second embodiment of the present invention.
Figure 4:
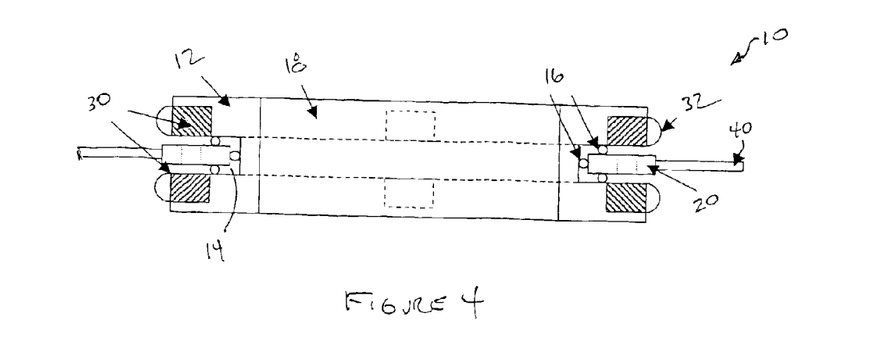
FIG. 4 is a cross-sectional view of the motor taken through line Y—Y in FIG. 3.

As embodied herein, and depicted in FIG. 3, a plan view of the circular rail induction motor in accordance with a second embodiment of the present invention is disclosed. In this embodiment motor casing 12 is a circularly shaped platform. Circular rail 20 is disposed along the outer perimeter of platform 12. As shown, four coil-pairs 30 are disposed in motor casing 12 at 90° intervals. Once again, those of ordinary skill in the art will recognize that any number of coil-pairs 30 may be employed. In this embodiment, center area 18 may be an empty void, or it may be filled with a solid material to form a platform. The platform may be used to mount host system components. In another embodiment, center area 18 may represent an encircled host system. Referring to FIG. 4, a cross-sectional view of the motor taken through line Y—Y in FIG. 3 is disclosed. As shown, circular rail 20 is retained within platform 12 by means of groove 14, which is formed around the outer perimeter of platform 12. Rail 20 is disposed between the coils in each coil-pair 30. Bearings 16 are disposed between rail 20 and casing 12, allowing rail 20 to freely rotate around platform 12, within groove 14. In this embodiment, heat sink devices 32 are disposed on each coil-pair 30 facing outward. As shown, an object to be rotated, such as fan blade 40 may be attached along the outer perimeter of rail 20. The descriptions of rail 20 and casing 12 provided above, are equally applicable to the embodiment depicted in FIGS. 3–4.

Figure 5A:
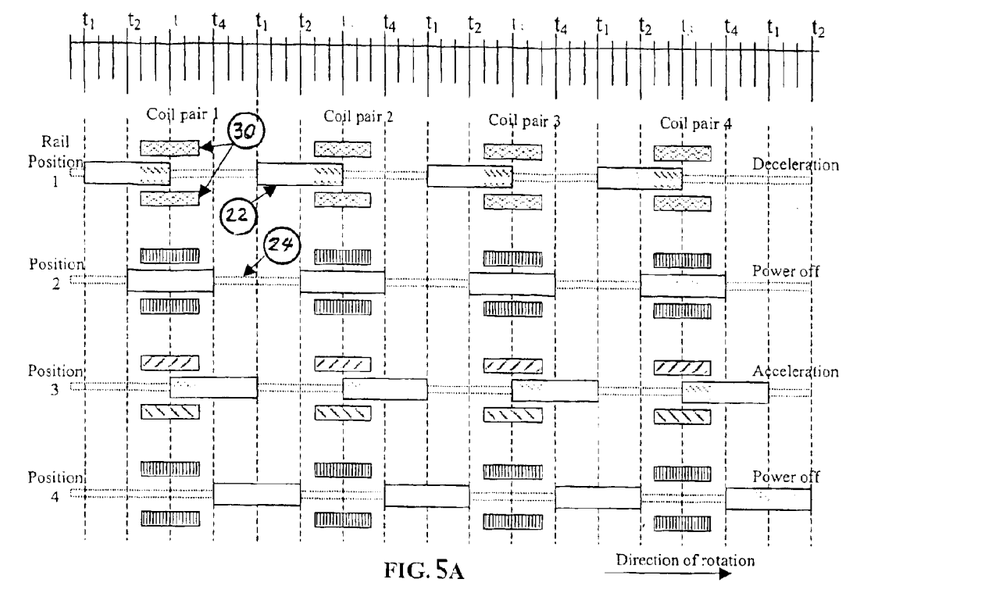
FIG. 5A is a diagrammatic depiction of a motor configured for simultaneous coil firing.

FIG. 5A is a diagram of a motor configured for simultaneous coil firing. As discussed above, segmented rail 20 consists of metallic segments 22 interleaved with non-metallic segments 24. The horizontal axis measures the position of each metallic segment 22 relative to its respective coil-pair 30. The vertical axis represents the positions of each coil-pair 30 on rail 20 depending on the coil firing mode of the motor, whether it be deceleration, power-off, or acceleration. The rail is moving from left to right. In this embodiment, the number, length, and spacing of metallic segments 22 is such that each coil-pair 30 has concurrent alignment with its respective metallic segment 22 depending on the mode. For example, during deceleration (position 1), a deceleration pulse is simultaneously transmitted to each coil-pair 30 as a metallic segment 22, moving from left to right, enters the gap between the coils in each coil-pair 30. The voltage applied to each coil-pair produces a current in the metallic segments resulting in a mutual inductance between the coil-pairs and the corresponding metallic segment. This mutual inductance results in reactive forces that tend to propel the metallic segments. In position 2, the coils are powered off. In position three, an acceleration pulse is transmitted to each coil simultaneously, the acceleration pulses tend to propel each metallic segment out of the gap between its coil-pair 30.

Figure 5B:
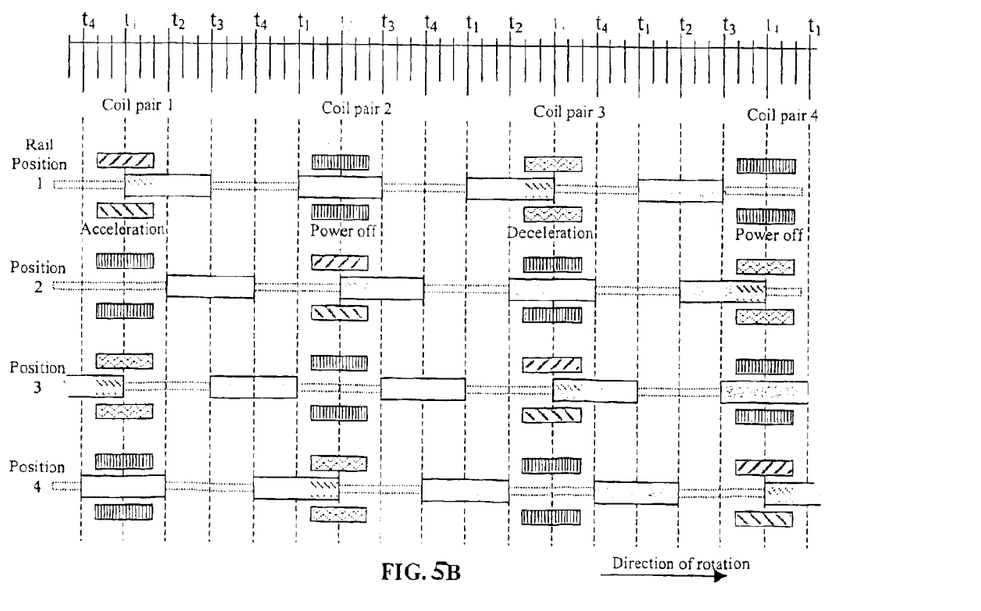
FIG. 5B is a diagrammatic depiction of a motor configured for sequential coil firing configuration.

FIG. 5B is a diagram of a motor configured for sequential coil firing. In this embodiment, the number, length, and spacing of the metallic segments are configured such that each coil pair is aligned with one of four quarter-power cycle positions. In this arrangement, power is applied to the coil pairs sequentially at one quarter duty cycle intervals. For example, at position 1, an acceleration pulse is transmitted to the first coil pair. The second and fourth coil pairs are turned off. Meanwhile, a deceleration pulse is transmitted to the third coil pair. In position 2, the acceleration pulse is applied to coil-pair 2. A deceleration pulse is applied to coil-pair 4. Coil-pair 1 and coil-pair 3 are turned off. The status of each coil-pair in position 3 and position 4 is clearly depicted in FIG. 5B.

In another embodiment not shown, motor 10 is equipped with sets of coil-pairs. All of the coil-pairs within a given set fire concurrently. However, each set of coil-pairs fires at a different duty cycle that is based on an off-set position of the set relative to a reference set.

Figure 6:
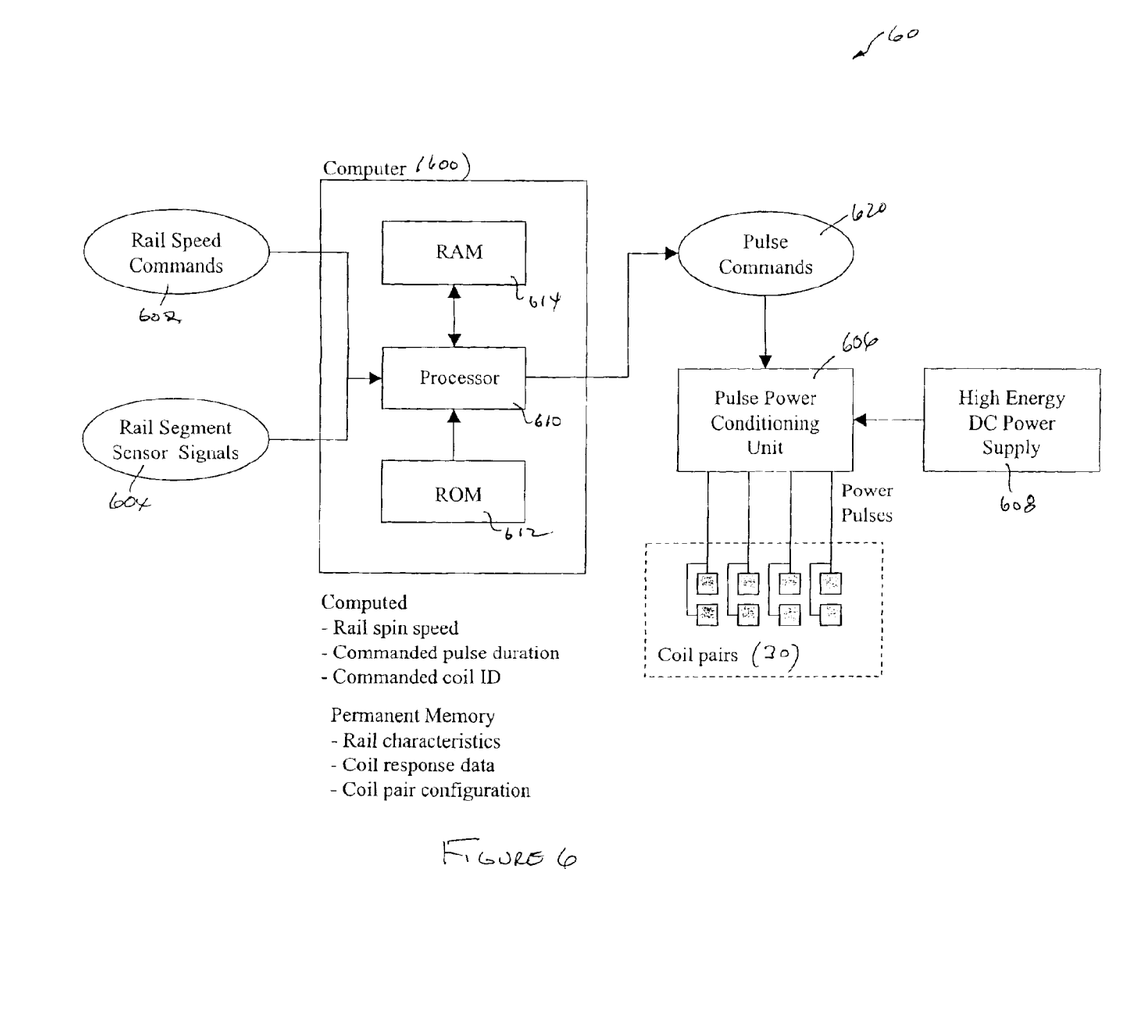
FIG. 6 is a functional block diagram of the motor control system.

As embodied herein, and depicted in FIG. 6, a functional block diagram of the motor control system 60 is disclosed. Rail speed command actuator 602 and rail segment sensor 604 are inputs to computer system 600. In response, computer system 600 provides pulse commands 620 to pulse power conditioning unit (PPCU) 606. PPCU 606 uses the pulse commands to drive coil-pairs 30. High energy power supply 608 is coupled to PPCU 606 to provide energy amplification to the pulse commands received from processor 610.

Those of ordinary skill in the art will recognize that many of the details of the motor design are dependent upon the application that motor 10 is designed for. The present invention is equally applicable to miniaturized devices or to large apparatuses adapted to heavy-duty applications. Therefore, the size and scale of certain components depends on the application. For example, the motor may be adapted for use in handheld devices, such as cassette recorders, or to displace large volumes of fluids or gases, or other such work. As another example, referring back to FIG. 1, motor 10 can also be configured as a self-propelled bearing, such as a wheel bearing. This impacts the materials used to fabricate rail 20 and coil-pairs 30. Because there is a wide-range of applications, PPCU 606 must be sized to accommodate the amplitude, frequency, timing, and duty-cycle characteristics of the voltage pulses transmitted to each of the coil-pairs employed in the design. The choice of system components may also depend on the desired range of rotational speeds provided by the motor.

Rail speed command actuator 602 may be of any suitable device depending on the complexity of the over-all system design. For example, in a relatively simple embodiment, actuator 602 may be implemented as a simple accelerator pedal, similar to the type of accelerator pedal employed in motor vehicles. In another embodiment, a plurality of motors may be networked together. In this case, rail speed commands may be provided to computer system 602 in a digital format, via a bus structure, or by a wireless medium.

Computer system 600 includes processor 610, ROM 612, and RAM 614. The algorithms used herein are relatively straightforward and do not require much processing power. In one embodiment, processor 610 may be implemented using an 8 bit semiconductor processor chip of the type manufactured by Intel, Motorola, Phillips, or AMD. Essentially, the present invention can be implemented using the lowest cost components on the market. However, one of ordinary skill in the art will recognize that 16-bit, or even 32-bit machines can be used to implement processor 610, depending on speed, size, cost, application and other design considerations. Those of ordinary skill in the art will also recognize that processor 610 can be implemented using Application Specific Integrated Circuits (ASICs).

The memory devices employed in the present invention may also be of any suitable type depending on the application and other design considerations. As shown, memory 612 includes a read/write random access memory (RAM) used in data processing and data I/O. RAM 612 is used to store input variables such as rail speed commands and rail segment sensor signals. RAM 612 is also used to store computed values such as current rail spin speed, commanded coil firing data, and commanded pulse interval data. ROM 614 is used for storing processor programming instructions, algorithms and permanent rail and coil parameters used by processor 610. ROM 614 may be implemented using a DRAM, ROM, PROM, EEPROM, hard drive, diskettes, compact disk, or any other computer readable medium.

PPCU 606 may be of any suitable type, depending on the applied power requirements of coil-pairs 30. PPCU is configured to receive digital control data from processor 610 and output firing pulses to the individual coil-pairs 30. The digital data may include the identifier (Cid) of the first coil to be fired in the sequential configuration, time between sequential firings (Tdf), the number of coil pairs (Nc), firing pulse duty cycle data (Tpd), and the applied voltage (Ec).

Figure 7:
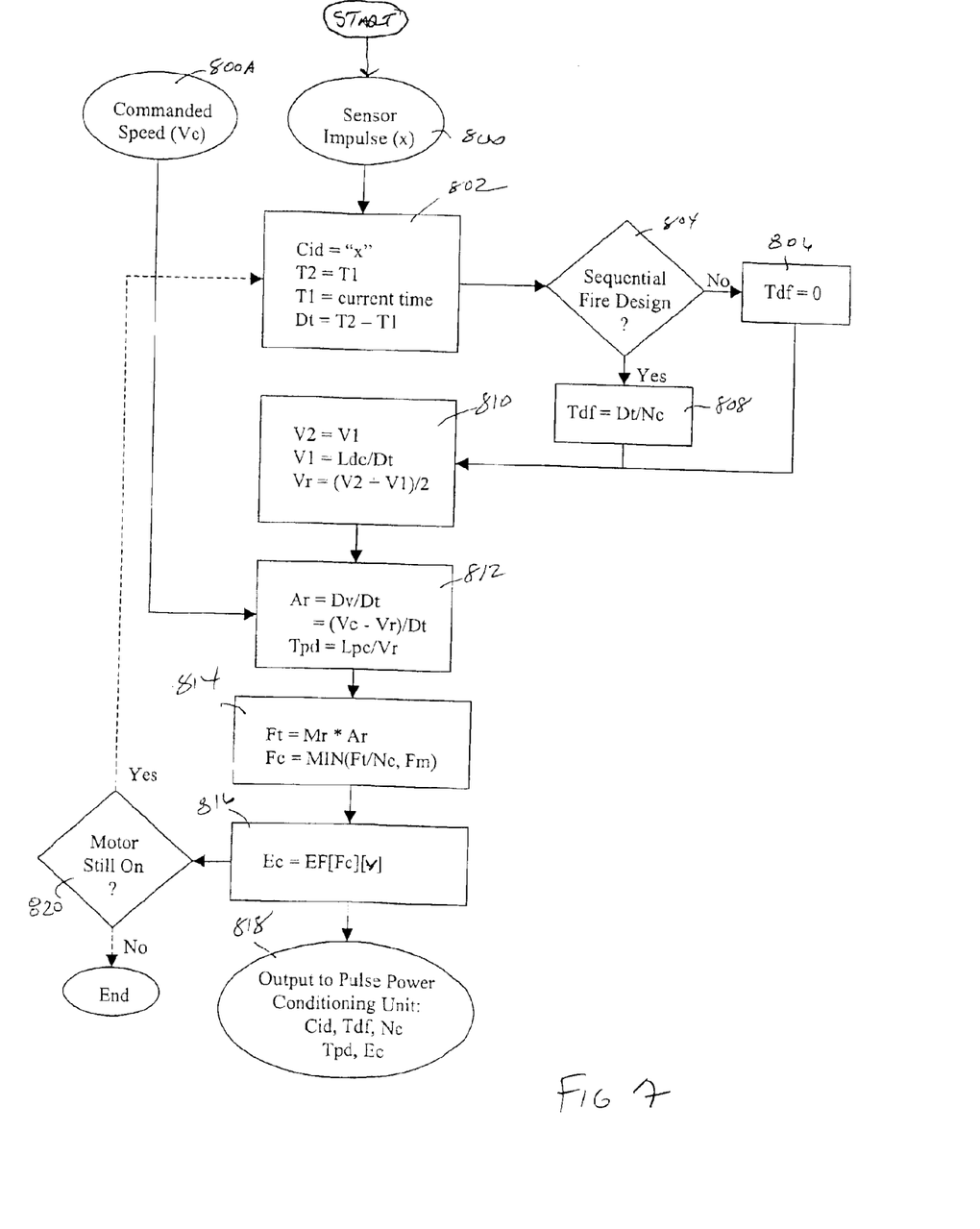
FIG. 7 is a flow chart showing a control routine in accordance with the present invention.

Referring to FIG. 7, a flow chart showing a control routine in accordance with the normal operation of control system 60 is disclosed. The control system computer receives input from a throttle or any kind of velocity command device. The input is in the form of a commanded spin velocity value (Vc). The computer also receives a trigger impulse signal from a sensor indicating it is time to fire the primary coil pair. Sensor impulse signals (x) from rail sensor 604 are received by computer system 600 and stored in RAM 614. The spin distance traveled by the rail from impulse to impulse, or length of the full duty cycle (Ldc), is the length of one segment plus the length of one between-segments gap. Ldc is a constant that is stored in permanent memory.

In step 802, the time (T1) of the most current sensor impulse is subtracted from the time (T2) of the last sensor impulse, to obtain the sensor duty cycle (Dt). The time between sequential firing, Tdf, is calculated next, based upon whether the system is configured to fire sequentially or simultaneously. Obviously, if system 10 is configured to fire simultaneously, time between sequential firings (Tdf) is zero, because all of the coil-pairs are fired at the same time. Otherwise, Tdf is equal to the sensor duty cycle (Dt), e.g., the time between sensor pulses, divided by the number of coil pairs (Nc). The computed value for Tdf is then stored in RAM and available for further use. The current rail velocity (V1) is obtained by dividing a rail unit length (Ldc), e.g. the sum of one metallic rail segment 22 and one non-metallic segment 24, by the sensor duty cycle Dt. The average rail velocity (Vr) is computed by dividing the sum of the current rail velocity (V1) and the previous computed rail velocity (V2), by the integer two.

In step 812, control system 60 compares average rail speed (Vr) to the commanded speed (Vc) provided by speed command actuator 602. Alternatively, V1 may be used in the calculation instead of Vr. Subsequently, the amount of acceleration (Ar) needed to drive Vr toward Vc is computed. Acceleration (Ar) is computed by dividing the difference of Vc and Vr by sensor duty cycle Dt. The amount of time power can be applied (Tpd) is a function of the power application length (Lpc) and the average rail velocity (Vr). As shown in FIG. 5A, the power application length (Lpc) refers to the position (position 3) relative to the coil-pair 30 wherein acceleration can be effected (on the other hand, note that deceleration is effected in position No. 1 of FIG. 5A). In step 810, the total electromagnetic force (Ft) needed to achieve rail acceleration is computed. The total force (Ft) that needs to be applied by the combined power pulses of all coil pairs over the next duty cycle is calculated as Mr*Ar, where Mr is the rail's moment of inertia constant that is stored in permanent memory. The commanded force (Fc) for each coil pair over the next duty cycle is then the lesser of either the maximum capability of a coil pair or the total required force divided by the number of coil pairs in the system (Nc). Ft is converted into the force (Fc) required to drive each coil pair.

Subsequently, the voltage (Ec) applied to each coil is computed. Again, those of ordinary skill in the art will recognize that the relationship between the coil force (Fc) and voltage (Ec) depends on the size of coil-pair used, the moment of Inertia of rail 20, and other parameters. One method of determining the voltage is to use an array that is stored in permanent memory that correlates the voltage values with resulting electromagnetic force values for the characteristic motor design. However, another characteristic of the motor design is the maximum length of the power cycle (Lpc). That is, the distance over the rail that power can be applied to achieve maximum power and efficiency. This distance, a constant that is stored in permanent memory, determines the amount of time that power can be applied (Tpd) as a function of the rail spin velocity, Tpd=Lpc/Vr. This power pulse duration time must also be considered is determining the required voltage. Another necessary consideration of Tpd is how it compares to response time (Trt) characteristic of the coils. As Tpd approaches the value of Trt, lower voltage values will be required.

In step 818, computer system 600 transmits the values Cid, Tdf, Nc, Tpd, along with the value of the applied voltage (Ec) to PPCU 606. As shown in step 820, this process repeats as long as motor 10 is operating.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An electric motor for rotating an object around a central axis, the motor comprising:
   a motor casing;
   a circular segmented rail element disposed within the motor casing a predetermined radial distance from the central axis, the circular segmented rail element including a plurality of metallic non-ferrous segments interleaved with a plurality of non-metallic segments, each of the plurality of metallic non-ferrous segments having a predetermined segment length; and
   at least one coil element connected to the motor casing, the circular segmented rail element being disposed adjacent the at least one coil element, the at least one coil element having a predetermined coil length that is less than or equal to the predetermined segment length, the at least one coil element being configured to apply electromagnetic energy to the circular segmented rail element, whereby the circular segmented rail element rotates around the central axis.

2. The motor of claim 1, wherein the motor casing includes a circular shaped void having a center coincident with the central axis.

3. The motor of claim 2, wherein the circular segmented rail element is retained in a groove disposed in the motor casing contiguous to the perimeter of the circular shaped void.

4. The motor of claim 1, wherein the motor casing is a circular shaped platform, the circular segmented rail element being retained within a groove disposed in a portion of the disk shaped platform contiguous to the perimeter of the circular shaped platform.

5. The motor of claim 1, wherein the circular segmented rail element comprises a continuous strip of non-ferrous metal, the continuous strip including voids comprising the plurality of non-metallic segments.

6. The motor of claim 1, wherein the circular segmented rail element comprises a continuous strip of non-metallic material interlaced with segments of solid strips of non-ferrous metal.

7. The motor of claim 1, wherein the plurality of metallic non-ferrous segments are comprised of shorted coils.

8. The motor of claim 5, wherein the non-ferrous metal includes aluminum.

9. The motor of claim 5, wherein the non-ferrous metal includes a metal alloy.

10. The motor of claim 1, wherein the at least one coil element includes at least one coil pair.

11. The motor of claim 10, wherein the at least one pair of coils includes two pairs of coils, the two pairs of coils being spaced 180° apart one from the other.

12. The motor of claim 10, wherein the at least one pair of coils includes four pairs of coils, the four pairs of coils being spaced at 90° intervals.

13. The motor of claim 10, further comprising:
   a sensor coupled to the circular segmented rail element, the sensor being configured to determine a relative position of at least one of the plurality of metallic segments; and
   a control system coupled to the at least one pair of coils and the sensor, the control system being configured to transmit pulse commands to the at least one pair of coils, whereby the at least one pair of coils provides the electromagnetic energy to the circular segmented rail element.

14. The motor of claim 13, wherein the control system uses the time between sensor pulses received from the sensor to compute a rail speed.

15. The motor of claim 14, wherein the control system computes an optimum pulse power and timing based on the computed rail speed and rail parameter information.

16. The motor of claim 10, wherein the at least one pair of coils includes a plurality of pairs of coils.

17. The motor of claim 16, wherein the control system is configured to transmit pulse commands to each of the plurality of pairs of coils simultaneously.

18. The motor of claim 16, wherein the control system is configured to transmit pulse commands to each of the plurality of pairs of coils sequentially.

19. The motor of claim 16, further comprising a memory device for storing rail parameter information and coil parameter information.

20. The motor of claim 19, wherein the parameter information is selected from the group including: length of a metallic segment; length of a non-metallic segment; number of metallic segments in the rail; diameter of the rail; number of coil pairs; length of power cycle; coil power parameter information; and/or moment of inertia of the rail.

21. The motor of claim 16, wherein the control system is configured to:
compute a target rail speed using the time between sensor inputs received from the sensor, and the rail parameter information stored in the memory;
compute optimum pulse power and timing based on the target computed rail speed; and
transmit at least one pulse command to the at least one pair of coils in accordance with compute optimum pulse power and timing, whereby the at least one pair of coils provides the electromagnetic energy to the circular segmented rail element.

22. The motor of claim 21, wherein the control system is configured to transmit the at least one pulse command to each of the at least one pairs of coils simultaneously.

23. The motor of claim 21, wherein the control system is configured to transmit the at least one pulse command to each of the at least one pairs of coils sequentially.

24. The motor of claim 21, wherein the rotation of circular segmented rail element is accelerated in response to the at least one pulse command.

25. The motor of claim 21, wherein the rotation of circular segmented rail element is decelerated in response to the at least one pulse command.

26. The motor of claim 21, wherein the control system adjusts optimum pulse power and timing based, at least partially, on the difference between the computer target rail speed and the actual rail speed.

27. The motor of claim 1, further comprising a heat dissipation element coupled to each coil in the at least one pair of coils.

28. The motor of claim 1, wherein the object includes a load bearing device configured to perform work.

29. The motor of claim 24, wherein the load bearing device is configured to move a volume of fluid or gas.

30. The motor of claim 24, wherein the load bearing device is configured to rotate a second object.

31. The motor of claim 1, wherein the electric motor comprises a self-propelled bearing.

32. The motor of claim 1, wherein the electric motor is a linear induction motor.

* * * * *